(12) United States Patent
Skaley

(10) Patent No.: US 7,299,935 B2
(45) Date of Patent: Nov. 27, 2007

(54) SUPPORT FOR PIPE CLAMPS

(76) Inventor: Wilbert A. Skaley, 14303-129 Avenue NW, Edmonton, AB (CA) T5L 4N9

( * ) Notice: Subject to any disclaimer, the term of this patent is extended or adjusted under 35 U.S.C. 154(b) by 0 days.

(21) Appl. No.: 11/139,408

(22) Filed: May 27, 2005

(65) Prior Publication Data

US 2005/0263662 A1 Dec. 1, 2005

(30) Foreign Application Priority Data

May 28, 2004 (CA) .................................. 2470815

(51) Int. Cl.
*E21B 19/14* (2006.01)
(52) U.S. Cl. ..................... 211/70.4; 211/60.1; 248/68.1
(58) Field of Classification Search ............... 174/496; 248/56, 68.1, 176.1, 292.13, 49, 80, 81, 89, 248/92, 136, 150; 211/60.1, 70.4, 68, 69.6, 211/70.8, 95, 104
See application file for complete search history.

(56) References Cited

U.S. PATENT DOCUMENTS

| | | | | |
|---|---|---|---|---|
| 1,768,413 A | * | 6/1930 | Lyth ............................ 108/37 |
| 2,903,138 A | * | 9/1959 | Brown ....................... 211/60.1 |
| 4,133,131 A | * | 1/1979 | Davy .......................... 43/21.2 |
| 4,378,107 A | * | 3/1983 | Wagster et al. ............... 269/95 |
| 4,424,907 A | * | 1/1984 | Robb ......................... 211/70.8 |
| 4,479,322 A | * | 10/1984 | Koppel ....................... 43/21.2 |
| 5,702,561 A | | 12/1997 | Phillips |
| 5,794,799 A | * | 8/1998 | Collins et al. ............. 211/70.6 |
| 5,803,519 A | * | 9/1998 | Daigle ......................... 294/159 |
| 5,947,583 A | * | 9/1999 | Castano ..................... 362/132 |
| 6,039,313 A | | 3/2000 | Baculy |
| 6,113,202 A | * | 9/2000 | Germano .................... 312/245 |
| 6,390,307 B1 | * | 5/2002 | Stelter ....................... 211/60.1 |
| 6,786,162 B1 | * | 9/2004 | Volkmer et al. ............ 108/115 |
| 7,044,178 B1 | * | 5/2006 | Campbell ................... 144/285 |

\* cited by examiner

*Primary Examiner*—Carl D. Friedman
*Assistant Examiner*—Bradley H Duckworth
(74) *Attorney, Agent, or Firm*—Christensen O'Connor Johnson Kindness PLLC

(57) ABSTRACT

A support for a pipe clamp includes a first body adapted to be mounted to a vertical surface and a second body pivotally connected to the first body for pivotal movement between a substantially vertical stored position and a substantially horizontal operative position. A first end of each one pipe clamp is secured to the first body. A second end of each pipe clamp is secured to the second body, when the second body is in the operative position.

7 Claims, 4 Drawing Sheets

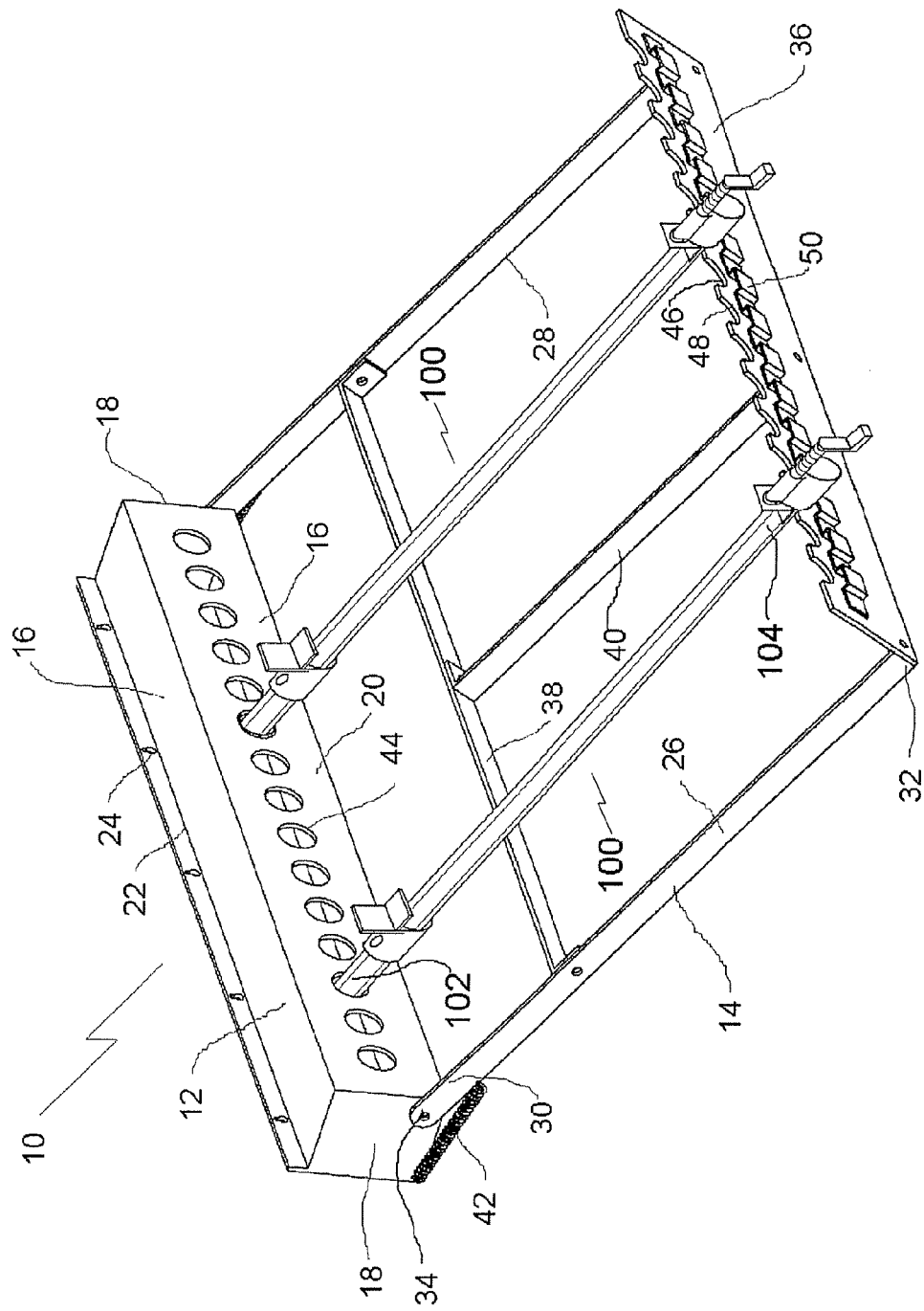

SUPPORT FOR PIPE CLAMPS

FIELD OF THE INVENTION

The present invention relates to a support for a pipe clamp, and more particularly for a support that is capable of supporting one or more pipe clamps to aid in the gluing and assembly of a work-piece, such as a wood panel.

BACKGROUND OF THE INVENTION

The common methods for gluing and clamping of wood panels either involve large clamping equipment with integral clamps or the use of individual clamps laid out on a table. In the case of large clamping equipment, the disadvantages are firstly that they are cost prohibitive to smaller woodworking shops or private individuals, and secondly that they take up a lot of floor space. In the case of using individual clamps on a table, the disadvantages are that the clamps are hard to align and hold in position, thereby decreasing productivity and the quality of clamped panels.

Pipe clamps (also known as "beam clamps", or "bar clamps") consist of a linear pipe, in the form of a beam, rod or bar, with a pair of opposing jaws. At least one of the opposing jaws is capable of movement along the pipe toward or away from the other of the opposing jaws. An illustration of a pipe clamp intended for use with the present invention is U.S. Pat. No. 6,039,313 (Baculy 2000).

SUMMARY OF THE INVENTION

What is required is a support for a pipe clamp.

According to the present invention there is provided a support for a pipe clamp which includes a first body adapted to be mounted to a vertical surface and a second body pivotally connected to the first body for pivotal movement between a substantially vertical stored position and a substantially horizontal operative position. Means are provided for securing a first end of at least one pipe clamp to the first body. Means are also provided for securing a second end of the at least one pipe clamp to the second body, when the second body is in the operative position.

Although the support, as described above, can be used to support a single pipe clamp, it is anticipated that it will be used for assembling and gluing operations involving more than one pipe clamp. A key advantage of the support, as described above, is its ability to be moved from an operative position to a stored embodiment. A preferred embodiment will be hereafter described with reference to accompanying drawings to illustrate that advantage. It must be appreciated that the shape and configuration of first body and second body can be changed without departing from the spirit and scope of the invention. Similarly, the means for engaging the first end and the second end of the pipe clamps can be altered.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 4 is a perspective view of two pipe clamps positioned in the support for a pipe clamp illustrated in FIG. 1.

DETAILED DESCRIPTION OF THE PREFERRED EMBODIMENT

Figure 1:
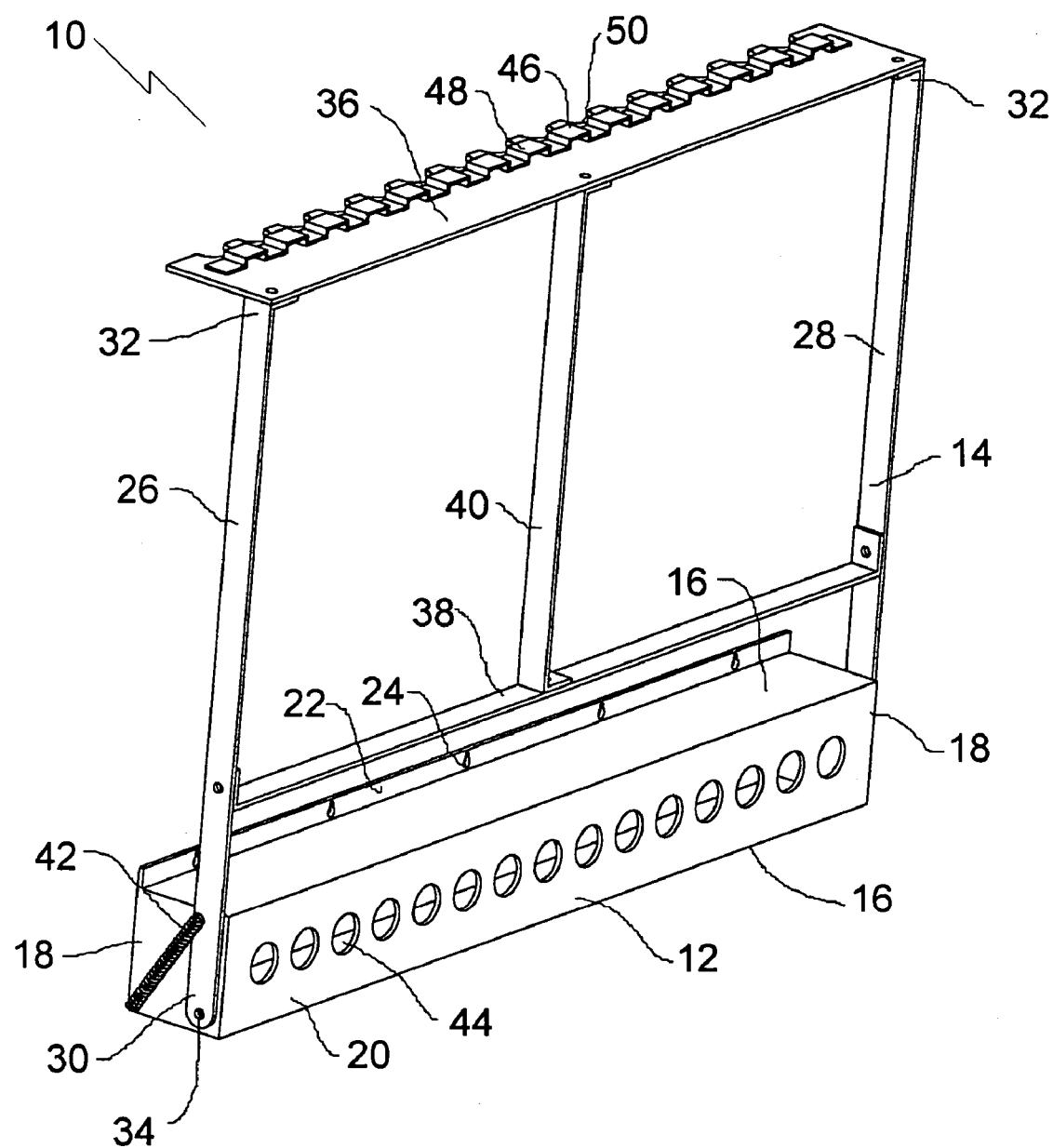
FIG. 1 is a perspective view of a support for a pipe clamp constructed in accordance with the teachings of the present invention, in a stored position.

The preferred embodiment, a support for a pipe clamp generally identified by reference numeral 10, will now be described with reference to FIGS. 1 through 4.

Figure 2:
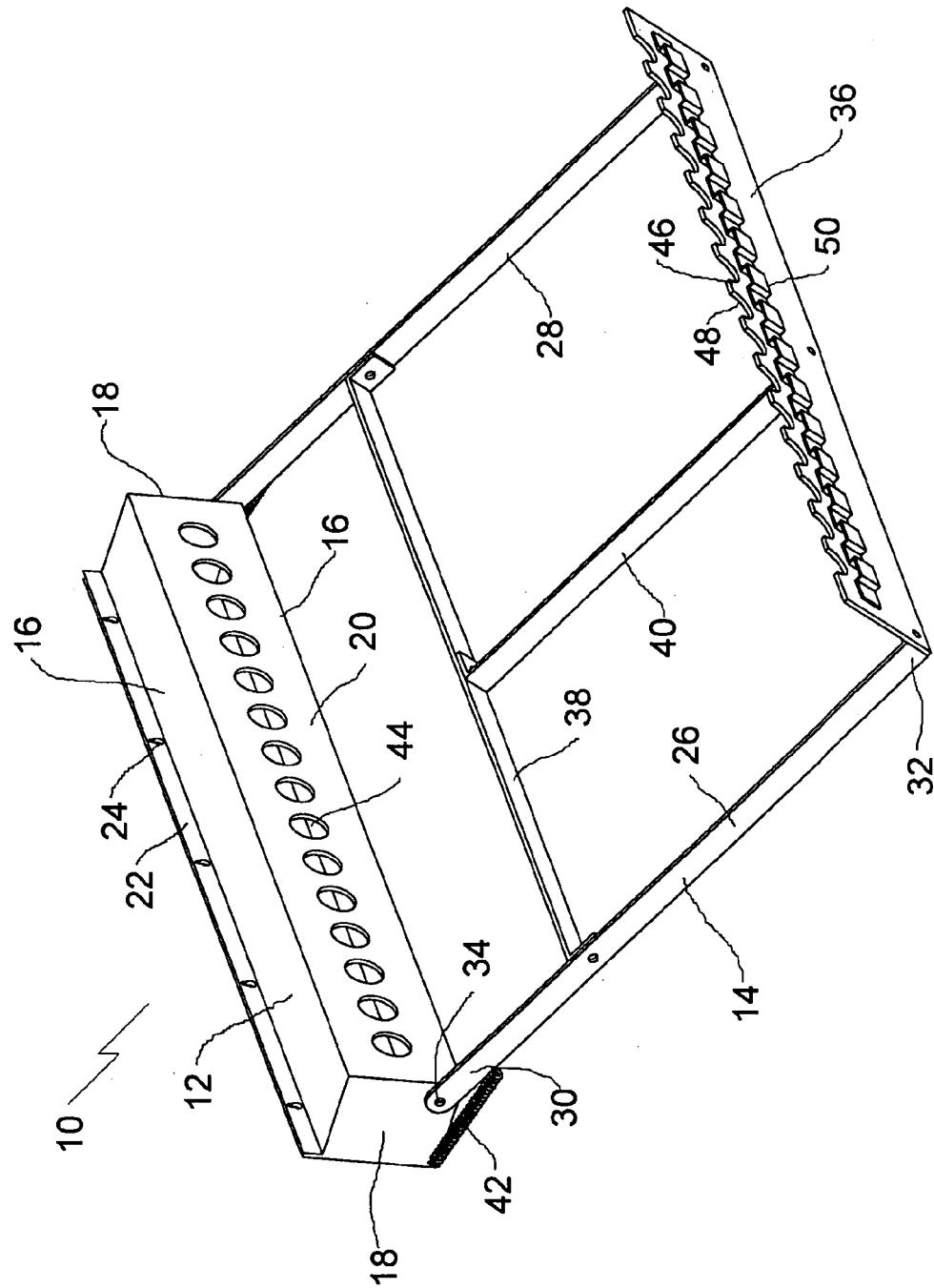
FIG. 2 is a perspective view of the support for a pipe clamp illustrated in FIG. 1, in an operative position.

Structure and Relationship of Parts:

Referring to FIG. 2, support 10 includes a first body 12 and a second body 14.

Figure 3:
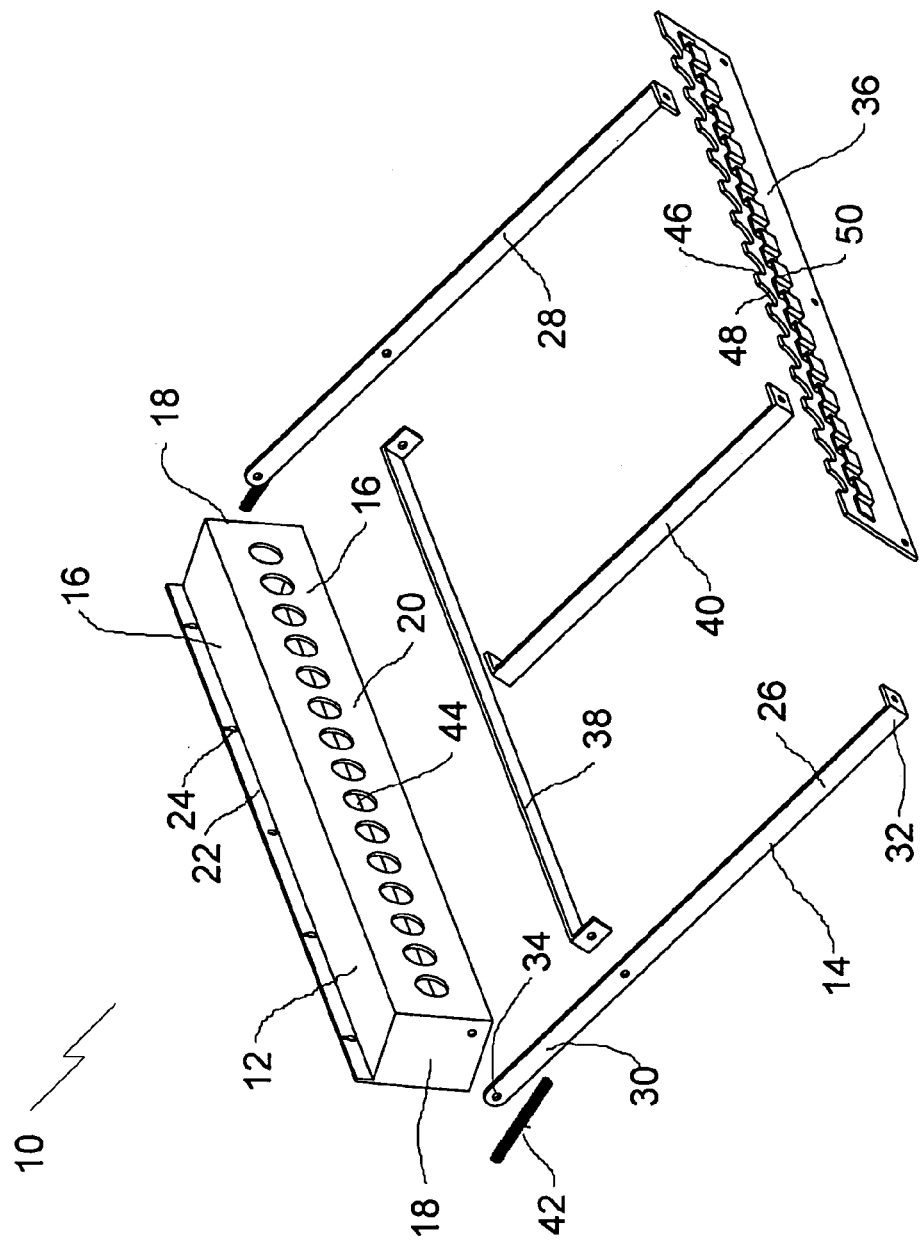
FIG. 3 is an exploded perspective view of the support for a pipe clamp illustrated in FIG. 1.

Referring to FIG. 3, first body 12 is in the form of an elongate box having opposed side walls 16, opposed end walls 18, and a front face 20. First body 12 is adapted to be mounted to a vertical surface (not shown) by the provision of a mounting flange 22 with openings 24. First body 12 may be secured to a vertical surface, such as a wall or a sidewall of a cabinet by extending screws or nails through openings 24 and into the vertical surface.

Referring to FIGS. 1 and 2, second body 14 is in the form of a frame. Referring to FIG. 3, second body has a pair of spaced side members 26 and 28. Each of side members 26 and 28 has a first end 30 and a second end 32. First end 30 of each of side members 26 and 28 is pivotally connected by pivot pin 34 to opposed end walls 18 of first body 12 for pivotal movement between a substantially vertical stored position as illustrated in FIG. 1 and a substantially horizontal operative position as illustrated in FIG. 2. Second end 32 of each of side members 26 and 28 is connected by an end member 36. Second body 14 also has two rigidifying internal brace members 38 and 40. Springs 42 serve to bias second body 14 into the stored position illustrated in FIG. 1. Springs 42 extend from opposed end walls 18 of first body 12 to side members 26 and 28 of second body 14. When springs 42 are moved to an over-centre position, as illustrated in FIG. 2, they serve to maintain second body 14 in the operative position.

Referring to FIG. 4, there are illustrated two pipe clamps, generally identified by reference numeral 100. Each pipe clamp 100 has a cylindrical first end 102 and a second end 104. Means must be provided for securing first end 102 of each pipe clamp 100 to first body 12. Referring to FIG. 3, in the illustrated embodiment there are provided a number of circular openings 44 arranged in parallel spaced relation along front face 20 of first body 12. Referring to FIG. 4, circular openings 44 receive cylindrical first end 102 of pipe clamps 100 with minimal clearance. The fact that first body 12 is in the form of a box, permits first end 102 to be inserted for a distance of several inches. Means must also be provided for securing second end 104 of each pipe clamp 100 to second body 14, when second body is in the operative position. Referring to FIG. 3, in the illustrated embodiment there are a number of receivers 46 in end member 36 of second body 14. Each of receivers 46 defines a slotted opening 48 and each of receivers 46 has an associated positioning notch 50.

Springs 42 allow for ease of lifting of the frame forming second body 14 and hold the frame in the selected position, whether it be the stored position or the operative position. Braces 38 and 40 maintain rigidity during movement. It is anticipated that the frame of second body 14 and the wall mountable box of first body 12 will be manufactured of a suitably strong material such as steel channel, however equally strong materials may be used. It is also anticipated that firm mechanical contact will be provided by strong connection means such as screws, bolts, nails or other equally strong connection means.

Operation:

The use and operation of support 10 will now be described with reference to FIGS. 1 through 4. Support 10 is intended to be accessible in both cost and accessibility by the small shop or individual craftsman. Referring to FIG. 1, to use support 10, the wall mountable box of first body 12 must be mounted to a vertical surface, such as a wall, using proper fasteners or anchors at a pre-determined height. All stock for gluing must be sawn straight on both edges for proper glue adhesion and quality. Referring to FIG. 2, the frame of second support 14 is lowered from its upright stored position. It is preferred that end member 36 of second body 14 be made to rest on a worktable of a predetermined height to position the frame of second body 14 at a comfortable working angle. Referring to FIG. 4, pipe clamps 100 are then placed in position on the frame of second body 14 and spaced according to standard clamping practices. This is done by inserting cylindrical first end 102 of each of pipe clamps 100 into one of circular openings 44 in first body 12. Second end 104 of each pipe clamp 100 is placed in one of notches 50 and engages with slotted opening 48 of one of receivers 46, such that slotted opening 48 supports second end 104 and notch 50 helps maintain the orientation of pipe clamp 100. Stock is then placed onto pipe clamps 100 one piece at a time with glue applied between adjoining pieces until the desired width is achieved. Pipe clamps 100 are then tightened and additional pipe clamps are applied on top of the stock to prevent bowing of the stock. The stock and pipe clamps 100 are then removed and set aside for drying, while new pipe clamps can be placed in the frame of second body 14 and the procedure can repeat itself. When the procedure is complete the frame of second body can be raised to its upright position for storing, as illustrated in FIG. 1, to allow the worktable to be used for other operations. It is notable that the invention can be used for clamping other items such as doors or any other flat stock.

Advantages:

The above described support 10 provides an improved device for aiding in the gluing and assembly of wood panels. It allows for a productive method of gluing and clamping without the disadvantage of high cost and also, because it attaches to a wall and can be hinged flat to a wall, it overcomes the problem of use of floor space. Furthermore this support eliminates the problem of aligning and holding pipe clamps in position and because this devise uses conventional pipe clamps, it allows for these clamps to be used for other purposes, thereby further decreasing costs.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follow:

1. A support for pipe clamps, comprising:
    a first body in the form of an elongated box which has a front face, opposed side walls, opposed end walls and at least one mounting flange with openings, the mounting flange positioned along at least one of the opposed side walls or opposed end walls, whereby the first body is secured to a vertical surface by means of surface piercing fasteners;
    a second body pivotally connected to the first body at the front face for pivotal movement between a substantially vertical stored position and a substantially horizontal operative position;
    more than one opening in the front face of the first body for securing a first end of at least one of the more than one pipe clamp to the first body; and
    means for securing a second end of at least one of the more than one pipe clamp to the second body, when the second body is in the operative position, the more than one opening in the front face for securing the first end and the means for securing the second end of the more than one pipe clamp securing the more than one pipe clamp in parallel spaced relation.

2. The support for pipe clamps as defined in claim 1, wherein the second body is in the form of a frame having a pair of spaced side members, each of the side members having a first end and a second end, the first end of each of the side members being pivotally connected to the first body, the second end of each side member being connected by an end member.

3. The support for pipe clamps as defined in claim 2, wherein the frame has rigidifying internal brace members.

4. The support for pipe clamps as defined in claim 1, wherein the biasing means are provided to bias the second body into the stored position.

5. The support for pipe clamps as defined in claim 4, wherein the biasing means are springs which extend from the first body to the second body.

6. The support for pipe clamps as defined in claim 2, wherein the means for securing a second end of at least one of the more than one pipe clamp to the second body includes more than one receiver in the end member.

7. A support for pipe clamps, comprising:
    a first body in the form of an elongate box having opposed side walls, opposed end walls, and a front face, the first body having a mounting flange with openings, the mounting flange being positioned along the opposed side walls, whereby the first body may be secured to a vertical surface by means of one of screws or nails;
    a second body in the form of a frame having a pair of spaced side members, each of the side members having a first end and a second end, the first end of each of the side members being pivotally connected to the opposed end walls of the first body for pivotal movement between a substantially vertical stored position and a substantially horizontal operative position, the second end of each side member being connected by an end member, the frame having rigidifying internal brace members;
    biasing means bias the second body into the stored position, the biasing means being springs which extend from the opposed end walls of the first body to the side members of the second body;
    means for securing a first end of each pipe clamp to the first body including more than one parallel spaced opening in the front face of the first body; and
    means for securing a second end of each pipe clamp to the second body, when the second body is in the operative position, including more than one receiver in the end member of the second body, each receiver having an associated positioning notch.

* * * * *